(12) United States Patent
Kobetsky

(10) Patent No.: US 6,722,095 B2
(45) Date of Patent: *Apr. 20, 2004

(54) SEAM PLATE FOR RETAINING ROOF DECKING MEMBRANE

(75) Inventor: Robert G. Kobetsky, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 98 days.

This patent is subject to a terminal disclaimer.

(21) Appl. No.: 10/027,055

(22) Filed: Dec. 20, 2001

(65) Prior Publication Data

US 2003/0033783 A1 Feb. 20, 2003

Related U.S. Application Data

(63) Continuation-in-part of application No. 09/933,230, filed on Aug. 20, 2001.

(51) Int. Cl.$^7$ ................................................. E04D 5/14
(52) U.S. Cl. ............................ 52/410; 52/512; 411/462
(58) Field of Search ..................... 52/410, 512, 506.05; 411/545, 461, 462, 463, 466

(56) References Cited

U.S. PATENT DOCUMENTS

| | | |
|---|---|---|
| 1,435,134 A | 11/1922 | Boley |
| 2,334,406 A | 11/1943 | Gray |
| 4,361,997 A | 12/1982 | DeCaro |
| 4,380,413 A | 4/1983 | Dewey |
| 4,455,804 A | 6/1984 | Francovitch |
| 4,630,984 A | 12/1986 | Reinwall et al. |
| 4,641,472 A | 2/1987 | Young et al. |
| 4,726,164 A | 2/1988 | Reinwall et al. |
| 4,763,456 A | 8/1988 | Giannuzzi |
| 4,787,188 A | 11/1988 | Murphy |
| 4,803,823 A | 2/1989 | Stenson |
| 4,900,208 A | 2/1990 | Kaiser et al. |
| 4,945,699 A | 8/1990 | Murphy |
| 4,987,714 A | 1/1991 | Lemke |
| 5,069,589 A | 12/1991 | Lemke |
| 5,102,275 A | 4/1992 | Hulsey |
| 5,217,339 A | 6/1993 | O'Connor et al. |
| 5,255,485 A | 10/1993 | Lemke et al. |
| 5,267,423 A | 12/1993 | Giannuzzi |
| 5,378,102 A | 1/1995 | Mossman |
| 5,709,059 A | 1/1998 | Murphy et al. |
| 5,915,903 A | 6/1999 | Osterle et al. |
| 6,250,034 B1 | 6/2001 | Hulsey |

FOREIGN PATENT DOCUMENTS

| | | |
|---|---|---|
| CH | 635907 | 4/1983 |
| DE | 85 25 358 | 2/1986 |
| FR | 1 362 380 | 4/1964 |
| GB | 2 027 786 | 8/1979 |
| NL | 77 00 937 | 8/1978 |

Primary Examiner—Carl D. Friedman
Assistant Examiner—Basil Katcheves
(74) Attorney, Agent, or Firm—Lisa M. Soltis; Mark W. Croll; Donald J. Breh

(57) ABSTRACT

A seam plate for use in connection with securing membrane sheets to underlying roof decking substructure comprises a substantially rectangular plate having a central aperture for receiving a bolt fastener. Upstanding rib structure is provided upon the plate so as to provide different regions thereof with different rigidity, flexibility, and bendability properties. The rib structure can have, for example, a substantially diamond-shaped configuration or an X-shaped configuration for respectively providing corner regions of the plate with increased or decreased flexibility. A plurality of downwardly extending projections, having substantially V-shaped cross-sectional configurations, are provided upon the underside of the seam plate so as to engage the membrane sheets and retain the same at their desired locations upon the underlying roof deck substructure assembly. The projections are arranged within longitudinally and transversely separated pairs so as to be dispersed throughout the extent of the plate so as to distribute pressure loads throughout the underlying membrane and thereby prevent tearing and rupture of the underlying membrane.

28 Claims, 5 Drawing Sheets

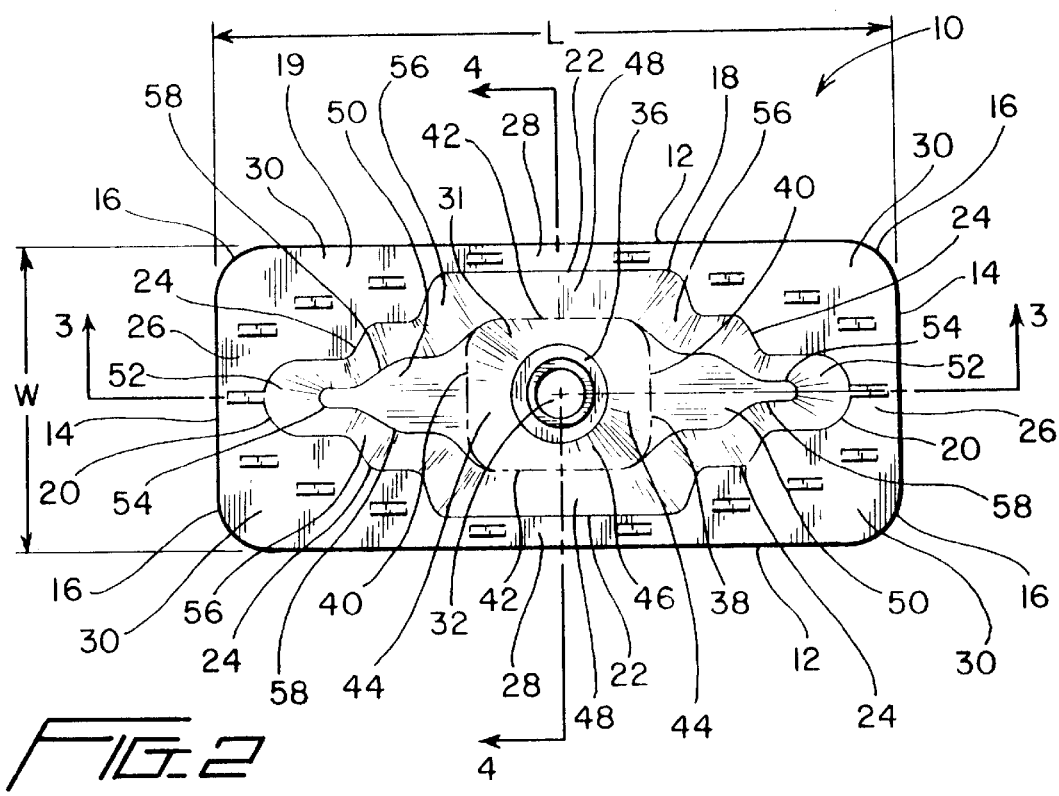

US 6,722,095 B2

SEAM PLATE FOR RETAINING ROOF DECKING MEMBRANE

CROSS REFERENCE TO RELATED PATENT APPLICATIONS

This patent application is a Continuation-in-Part (CIP) patent application of U.S. patent application Ser. No. 09/933,230, entitled SEAM PLATE FOR RETAINING ROOF DECKING MEMBRANE, which was filed on Aug. 20, 2001 in the name of Riaz Hasan.

FIELD OF THE INVENTION

The present invention relates generally to seam plates for use in connection with the retention of roof decking membranes upon roof decking substructures at seam locations defined between separate, adjacent, and overlapping membrane members, and more particularly to a new and improved seam plate, and a roof decking system employing the same, wherein improved retention of the membrane member upon the roof decking substructure is able to be achieved without generating or initiating tearing or other similar deterioration of the roof decking membrane when the membrane is subjected to wind or other environmental forces.

BACKGROUND OF THE INVENTION

Stress plates or seam plates are used in connection with the retention of roof decking membranes upon roof decking substructures at seam locations defined between separate but adjacent or overlapping membrane members, and are of course well-known in the art. Examples of such seam plates or stress plates are disclosed within U.S. Pat. No. 4,945,699 which issued to Colin R. Murphy on Aug. 7, 1990, as well as U.S. Pat. No. 4,787,188 which also issued to Colin R. Murphy on Nov. 29, 1988. As disclosed within FIGS. 1, 3A–3C, and 4 of the aforenoted U.S. Pat. No. 4,945,699 to Murphy, the roof decking substructure is disclosed at 103 and may conventionally be provided with overlying insulation 102. The insulation 102 is, in turn, adapted to have membranes disposed thereon in an overlying manner, and at a location or site at which separate and adjacent membranes are to be in effect seamed together in an overlapping manner, a first underlying membrane is disclosed at 101 and is adapted to be secured to the underlying deck substructure 103 by means of a screw fastener 107 passing through a seam plate or stress plate 10, while a second membrane member 104 is adapted to be secured in an overlapping manner upon the first underlying membrane member 101 by means of a welded seam 111. The seam plate or stress plate 10 is seen to have a circular configuration, and is provided with an upper surface 11 and a lower surface 12. A central aperture 15 is provided for passage therethrough of the screw fastener 107, and a circular reinforcing rib 14 annularly surrounds the central aperture 15. Accordingly, when such a stress plate or seam plate 10 is to be used to secure membrane members to the underlying decking substructure 103, the stress plate or seam plate 10 is disposed atop the first underlying membrane member 101, and the stress plate or seam plate 10 is then fixedly secured to the underlying decking substructure by means of screw fastener 107 being threadedly engaged with the underlying decking substructure. In accordance with the particularly unique stress plate or seam plate 10 as disclosed within the noted Murphy patents, the bottom surface 12 of the stress plate or seam plate 10 is provided with a plurality of circumferentially spaced prongs or tangs 21 each of which terminates in a gripping point 22. The prongs or tangs 21 each have a substantially triangular configuration and are in effect partially punched-out or otherwise cut from the bottom surface portion 12 of the plate 10, and are subsequently bent such that the prongs or tangs 21 attain their desired disposition with respect to the bottom surface portion 12 of the plate 10. Such prongs or tangs 21 will therefore grip the lower or underlying membrane sheet 101 and prevent the same from becoming loose or free with respect to the stress plate 10 or the underlying roof substructure 103 despite wind or other environmental forces being impressed upon the membrane sheet 101.

While the aforenoted stress or seam plates of Murphy have been satisfactory and commercially successful, it has been experienced that, despite well-meaning statements of intent to the contrary as set forth in the Murphy patents, the presence of the pointed prongs or tangs 21 characteristic of the stress plate or seam plate 10 of the Murphy patents do in fact tend to puncture, tear, weaken, and otherwise cause deterioration of the membrane sheets 101 under wind and other environmental conditions. Obviously, such a state is not satisfactory in view of the fact that eventually, the membrane sheets tear away from the overlying seam plate 10 as well as away from the underlying insulation panel and roof decking, with the consequent result being the compromise of the structural integrity of the entire roof decking system.

A need therefore existed in the art for a new and improved stress plate or seam plate wherein the stress plate or seam plate could satisfactorily engage the insulation-protection membrane sheets so as to secure the membrane sheets to the underlying decking substructure, and yet, the means formed upon the stress plate or seam plate for engaging the membrane sheets would not tend to initiate tearing of the membrane sheets and thereby cause separation of the membrane sheets with respect to the stress plate or seam plate as well as the underlying decking substructure under, for example, windy or other forceful environmental conditions. Accordingly, the invention embodied within aforenoted U.S. patent application Ser. No. 09/933,230 was developed wherein, contrary to the PRIOR ART stress plate having the sharp-pointed prongs or tangs provided thereon, a plurality of circumferentially spaced, downwardly extending projections having substantially V-shaped cross-sectional configurations were provided upon the underside of the seam or stress plate wherein the projections comprised substantially rounded or radiused apices so as not to puncture or rupture the membrane sheets, and yet such projections could satisfactorily engage the membrane sheets so as to fixedly retain the same upon the underlying roofing deck substructural assembly.

While the seam plate or stress plate developed in accordance with the principles and teachings of the invention as set forth within the aforenoted U.S. patent application Ser. No. 09/933,230 has performed quite satisfactorily and has been commercially successful, it has been determined that such stress plate or seam plate cannot necessarily optimally accommodate all uplifting wind load forces, or ensure the maintenance of the membranes in their secured state upon the underlying insulation panel, as functions of, or interdependent upon, the particular membranes being employed. For example, the weather protection membranes have conventionally comprised membranes having a width dimension of approximately six feet (6.00'), however, within recent times, and in accordance with new industry standards or norms, membranes having width dimensions on the order of, for example, nine feet (9.00'), seem to be utilized more often. Consequently, such newer membranes comprise or cover square footage areas which are substantially fifty percent (50%) greater than those of the conventional or previously utilized membranes, and accordingly, such larger membranes represent or generate enhanced wind loads or forces acting upon the membranes, the seam or membrane plates, and the bolt fasteners securing the membranes and the seam plates to the underlying insulation panels and roof decking. Therefore, membrane and bolt fastener assembly failures are likely to increase, unless the aforenoted problems are adequately addressed. A proposed solution to the problem has been to simply increase the number of attachment sites at which the seam plates and bolt fasteners can be secured to the underlying insulation panels and roof decking, however, this is not a viable solution for several reasons.

For example, the number of attachment sites, or more particularly, the array or arrangement of the attachment sites, is predetermined, or in effect dictated, by means of the underlying roof decking in view of the fact that the bolt fasteners must be threadedly engaged within the crest portions of the roof decking. Conventionally, the predetermined distance defined between adjacent corrugations of the roof decking, as measured, for example, from crest to crest, is six inches (6.00"), and in accordance with conventional techniques for affixing the membranes to the underlying roof decking, the seam plate and bolt fastener assemblies are secured to alternative crest portions of the roof decking such that the predetermined distance defined between adjacent seam plate and bolt fastener assemblies is twelve inches (12.00"). Therefore, if additional attachment sites, at which additional seam plate and bolt fastener assemblies would be installed, were to be employed, the additional seam plate and bolt fastener assemblies would be installed within those crest portions of the roof decking which do not currently have seam plate and bolt fastener assemblies installed therein, thereby effectively doubling the number of seam plate and bolt fastener assemblies used to secure the membranes to the underlying roof decking. However, the effective doubling of the seam plate and bolt fastener assemblies renders the attachment system prohibitively expensive in terms of both hardware costs as well as man-hour installation costs.

A need therefore exists in the art for a new and improved seam plate for retaining roof decking membranes at their installed positions upon underlying insulation panels and roof decking wherein the new and improved seam plate will comprise structure integrally incorporated therein for effectively counteracting uplifting wind load forces acting upon the membranes, and therefore, in turn, acting upon the seam plate and bolt fastener assemblies attaching the membranes to the underlying insulation panels and roof decking, for effectively tailoring the structure of the seam plate for use in connection with different membranes having different strength or resistance properties or characteristics, for enabling different sections or regions of the seam plate to effect different gripping or retaining forces upon the membranes so as to, again, counteract uplifting wind load forces acting upon the different sections or regions of the seam plate, and for optimally reducing the tendency of any tearing to occurrence within the membranes, as well as the propagation of any tears within the membranes, under uplifting wind load force conditions.

OBJECTS OF THE INVENTION

Accordingly, it is an object of the present invention to provide a new and improved seam plate for use in connection with the fixing or securing of membrane sheets to underlying roof decking substructures.

Another object of the present invention is to provide a new and improved seam plate for use in connection with the fixing or securing of membrane sheets to underlying roof decking substructures wherein the seam plate effectively overcomes the various operational disadvantages or drawbacks characteristic of conventional PRIOR ART seam plates.

An additional object of the present invention is to provide a new and improved seam plate for use in connection with the fixing or securing of membrane sheets to underlying roof decking substructures wherein the seam plate effectively overcomes the various operational disadvantages or drawbacks characteristic of conventional seam plates by providing the seam plate with a substantially rectangular configuration so as to be capable of optimally counteracting the directional characteristics of the uplifting wind load forces which are impressed upon the underlying membrane sheets and which are therefore, in turn, transmitted to the seam plate and bolt fastener assemblies fixedly securing the underlying membrane sheets to the underlying insulation panels and roof decking.

A further object of the present invention is to provide a new and improved seam plate for use in connection with the fixing or securing of membrane sheets to underlying roof decking substructures wherein the seam plate effectively overcomes the various operational disadvantages or drawbacks characteristic of conventional seam plates by having different rib structure integrally incorporated therein so as to impart various reinforcing and bending or flexibility characteristics to the seam plate as functions of, or with respect, to the various characteristics or parameters of the membrane sheets, under such aforenoted uplifting wind or other environmental force conditions.

A last object of the present invention is to provide a new and improved seam plate for use in connection with the fixing or securing of membrane sheets to underlying roof decking substructures wherein the seam plate effectively overcomes the various operational disadvantages or drawbacks characteristic of conventional seam plates by having integrally incorporated therein different downwardly extending projections for engaging the underlying membrane sheets, and wherein further, the downwardly extending projections can have different configurations, different depth dimensions, and are located along different longitudinal linear loci of the seam plate so as to exhibit or generate different membrane-gripping properties or characteristics, to reduce the tendency of any tearing to occur within the membranes, and to prevent the propagation of any tears within and throughout the membranes, under the uplifting wind load force conditions.

SUMMARY OF THE INVENTION

The foregoing and other objectives are achieved in accordance with the teachings and principles of the present invention through the provision of a new and improved seam plate which has a substantially rectangular configuration so as to optimally accommodate and counteract the directional characrteristics of the uplifting wind load forces impressed upon the underlying roof decking membrane sheets. In addition, the seam plate comprises different substantially elongated centralized rib structure for imparting different stiffness and flexibility characteristics to the seam plate so as to in turn accommodate, and thereby render the same operationally compatible with, different membrane sheets having different strength, abrasion resistance, and tear-resistance characteristics or properties. Still further, the seam plate comprises a plurality of downwardly extending projections, which are adapted to operatively engage and thereby grip the underlying membrane sheets so as to retain the same at their predetermined positions atop the insulation panels and roof decking, wherein the projections have rounded apices so as not to readily cut or tear the membrane sheets, and wherein further, the projections have various depth dimensions so as to generate or exhibit different membrane-gripping forces. Still further, the projections are disposed upon predeterminedly scattered or dispersed regions of the seam plate located along different longitudinal and transverse linear loci so as to reduce the tendency of any tearing to occur within the membrane sheets, as well as to effectively prevent the propagation of any tearing of the membrane sheets throughout the entire extent of the membrane sheets, as a result of the non-concentration of loading at or upon predetermined membrane sheet locations.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 2 is a top plan view of a first embodiment of a new and improved seam plate, for use in connection with the fixation of roof decking membrane sheets upon underlying insulation panels and roof decking, as constructed in accordance with the principles and teachings of the present invention and showing the significant structural components thereof;

FIG. 3 is a longitudinal cross-sectional view of the seam plate as shown in FIG. 2 and as taken along the lines 3—3 of FIG. 2;

FIG. 4 is a lateral or transverse cross-sectional view of the seam plate as shown in FIG. 2 and as taken along the lines 4—4 of FIG. 2;

FIG. 6 is an enlarged detailed cross-sectional view of one of downwardly extending membrane sheet-engaging projections as incorporated within the seam plate shown in FIGS. 2–5;

DETAILED DESCRIPTION OF THE ILLUSTRATED EMBODIMENTS

Figure 1:
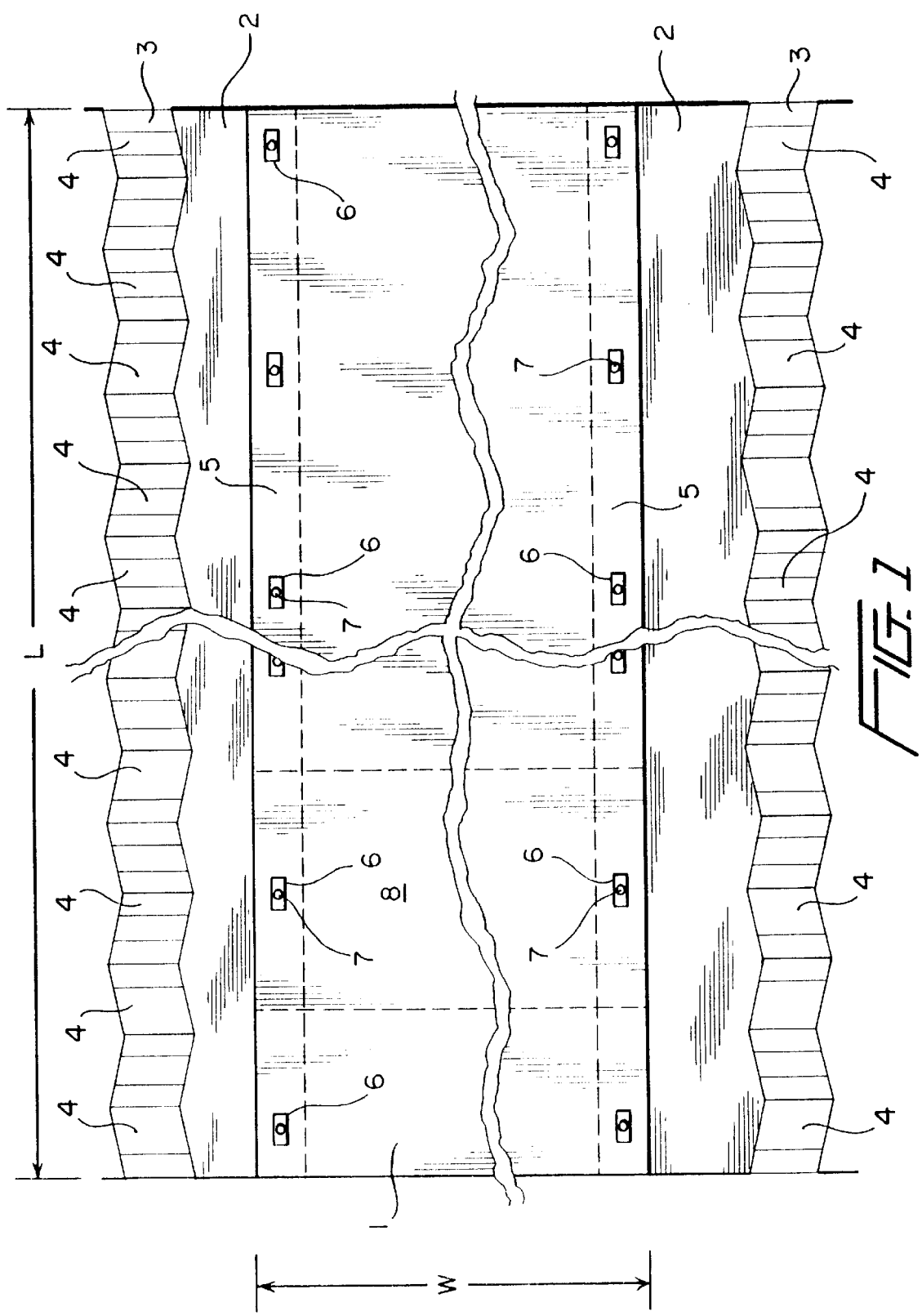
FIG. 1 is a top schematic plan view showing the layout of a roof decking membrane sheet as it would be fixedly attached to underlying insulation panel and roof decking substructure by means of a plurality of seam plates and bolt fasteners arranged along the opposite longitudinal edge portions thereof.

Referring now to the drawings, and more particularly to FIG. 1 thereof, it is to be initially understood that in connection with the conventional fixation of a membrane sheet 1 to an underlying substructure comprising, for example, an insulation panel 2 and underlying roof decking 3, each one of the roof decking membrane sheets 1 may conventionally have a longitudinal length dimension L of, for example, one hundred feet (100.00'), and a transverse width dimension W of, for example, nine or ten feet (9.00–10.00'). It is further known that the underlying roof decking 3 comprises a corrugated structure comprising a plurality of crest portions 4 which are spaced or separated a predetermined distance D apart from each other on the order of six inches (6.00"). Still further, the roof decking membrane sheets 1 are each adapted to be secured to the underlying roof decking 3 along longitudinally extending seamed regions 5, as illustrated by means of the dotted line, by means of a plurality of seam plates, generically shown at 6, which are fixedly secured to alternative ones of the crest portions 4 of the underlying roof decking 3 by means of suitable bolt fasteners 7. In this manner, it can therefore be further appreciated that each seam plate and bolt fastener assembly 6, 7 is effectively responsible for maintaining an integral strip 8, as shown by means of the dotted lines, of each membrane sheet 1 attached and secured to the underlying roof decking 3, wherein each integral strip 8 of each membrane sheet 1 has a length dimension of nine or ten feet (9.00–10.00') and a width dimension of one foot (1.00'), respectively. It can therefore be readily appreciated still further that when uplifting wind load forces act upon each one of the membrane sheets 1, substantially larger load forces, oriented in the widthwise direction W, are effectively impressed upon the seam plate and bolt fastener assemblies 6, 7 than those load forces which are effectively impressed upon the seam plate and bolt fastener assemblies 6, 7 as a result of being oriented in the lengthwise direction L. In particular, the difference or ratio between such longitudinally and transversely oriented wind load forces is on the order of 9–10:1 corresponding to the difference in the length and width dimensions of each membrane sheet strip 8.

Accordingly, in view of the disparity between the transversely or widthwise oriented loads and the longitudinally or lengthwise oriented loads acting upon the seam plate and bolt fastener assemblies 6, 7, it has been determined that in order to optimally counteract, resist, or accommodate such significantly different transversely and longitudinally oriented wind load forces, the seam plates should have correspondingly different length and width dimensions. Obviously, it is not viable that the seam plates have a length-to-width dimensional ratio of 9–10:1, however, a seam plate having a substantially rectangular configuration, and wherein the length-to-width ratio is on the order of approximately 2:1, has been determined to be viable.

Accordingly, a first embodiment of a new and improved seam plate, which has been constructed in accordance with the teachings and principles of the present invention, is illustrated within FIGS. 2–5 and is generally indicated by the reference character 10. As can best be appreciated from FIGS. 2 and 5, the seam plate 10 has a substantially rectangular configuration comprising a longitudinal extent or length dimension L of, for example, 4.63 inches (4.63") and a lateral or transverse extent or width dimension W of, for example, two inches (2.00") such that the length-to-width dimensional ratio of the seam plate 10 is greater than 2:1, and is in fact approximately 2.32:1. Such a length-to-width dimensional ratio is significantly better than that of a seam plate having a circular configuration, wherein the length-to-width dimensional ratio is obviously 1:1, in that seam plate 10 comprises inherent structural characteristics which enable such seam plate 10 to effectively counteract, resist, or accommodate the significantly different transversely and longitudinally oriented directional characteristics of the uplifting wind load forces having the aforenoted disparate values.

With reference still being made to FIGS. 2–5, it is seen that in accordance with the substantially rectangular configuration of the seam plate 10, the seam plate 10 comprises a pair of oppositely disposed longitudinal side edge portions 12, 12, and a pair of oppositely disposed transverse end edge portions 14, 14. In addition, the seam plate 10 does not comprise any sharp peripheral edge portions, including the corner regions thereof, so as not to readily cause any tearing of the roof decking membranes 1, and therefore, in particular, the corner regions 16, which integrally interconnect each longitudinal side edge portion 12 to a transverse end edge portion 14, are all rounded or radiused.

Still further, it is seen that substantially the entire central region of the seam plate 10, which is fabricated from a suitable metal, is provided with a vertically upset, raised, or displaced section 18 which effectively forms a strengthening rib structure with respect to the primary planar plate section 19 of the seam plate 10. The rib structure 18 is seen to have a somewhat distorted diamond-shaped configuration, wherein the oppositely disposed longitudinal ends 20, 20 of the rib structure 18 are rounded or radiused and are symmetrically disposed upon opposite sides of the longitudinal axis 60, the oppositely disposed lateral sides 22, 22 of rib structure 18 are longitudinally linear so as to be symmetrically disposed upon opposite sides of the transverse axis 62, and the peripheral edge portions of the rib structure 18, which interconnect each lateral side 22 of the rib structure 18 with each longitudinal end 20 of the rib structure 18, have scalloped or stepped configurations as disclosed at 24. The longitudinal ends 20, 20 of the rib structure 18 are respectively spaced longitudinally inwardly from the transverse end edge portions 14, 14 of the planar plate 19 by means of longitudinal border plate sections 26, 26, the lateral sides 22, 22 of the rib structure 18 are respectively spaced transversely inwardly from the longitudinal side edge portions 12, 12 of the planar plate 19 by means of lateral border plate sections 28, 28, and the scalloped or stepped edge portions 24 of rib structure 18 are respectively spaced diagonally inwardly from each corner region 16 of the planar plate 19 by means of corner border plate sections 30, 30, all for a purpose as will be discussed shortly hereinafter.

The centralmost section of the rib structure 18 of the seam plate 10 comprises a downwardly recessed region 31 provided with an aperture 32 through which a suitable bolt fastener comprising, for example, any one of the bolt fasteners 7, may be passed so as to fixedly secure the seam plate 10 of the present invention, in lieu of each one of the conventional seam plates 6, to a crest portion 4 of an underlying roof decking 3, as may be appreciated from FIG. 1. The structure of the seam plate 10 which defines the central aperture 32 comprises a vertically downwardly extending annular neck portion 34 through which the shank portion of the bolt fastener 7, will be disposed, and an annular shoulder portion 36 upon which the head portion of the bolt fastener 7 will be seated. The recessed region 31 of the rib structure 18 is circumscribed by means of a substantially rectangular upper peripheral ridge portion 38 which is defined by means of a pair of oppositely disposed upper end ridge lines 40, 40 and a pair of oppositely disposed upper side ridge lines 42, 42, and it is seen that a pair of upwardly inclined recessed end walls 44, 44 integrally connect the annular shoulder portion 36 to the upper end ridge lines 40, 40, while a pair of upwardly inclined recessed side walls 46, 46 integrally interconnect the annular shoulder portion 36 to the upper side ridge lines 42, 42.

In a similar manner, the rib structure 18 of the seam plate 10 further comprises a pair of downwardly inclined external side walls 48, 48 which integrally interconnect the upper side ridge lines 42, 42 to the lateral side border plate sections 28, 28, while substantially triangular uppermost plateau sections 50, 50 of rib structure 18, through means of their base sections, are inclined slightly downwardly from the upper end ridge lines 40, 40. In turn, a pair of downwardly inclined external end walls 52, 52 integrally interconnect apex regions 54, 54 of the triangular plateau sections 50, 50 to the longitudinal border plate sections 26, 26, while a pair of downwardly inclined external angled walls 56, 56 integrally interconnect the leg portions 58 of each triangular plateau section 50 to a respective one of the corner border plate sections 30. It can therefore be readily appreciated from the foregoing that the provision of the rib structure 18 upon the seam plate 10, and in particular the presence of the central peripheral ridge lines 40, 42, as well as the ridge lines 58 which effectively separate the plateau regions 50 from the inclined external angled walls 56, provides significant rigidity to the seam plate 10 along both of the longitudinal and transverse rib axes 60, 62, as best seen for clarity purposes from FIG. 5, as well as within the vicinities or regions of the external side walls 48 and the external angled walls 56. It is particularly noted further, however, that in view of the fact that the rib structure 18, and more particularly, for example, the external angled walls 56 thereof, are disposed relatively remote from the rounded corner regions 16 of the seam plate 10, the particularly structured seam plate 10 provides the corner border plate sections 30 with a relatively smaller degree of rigidity. Accordingly, the seam plate 10 is particularly useful or well adapted for use in connection with roof decking membranes 1 which exhibit, for example, a low degree of abrasion or tear resistance whereby, for example, under uplifting wind load forces, the corner border plate sections 30 of the seam plate 10 can exhibit a predetermined amount of bending or flexure.

Figure 5:
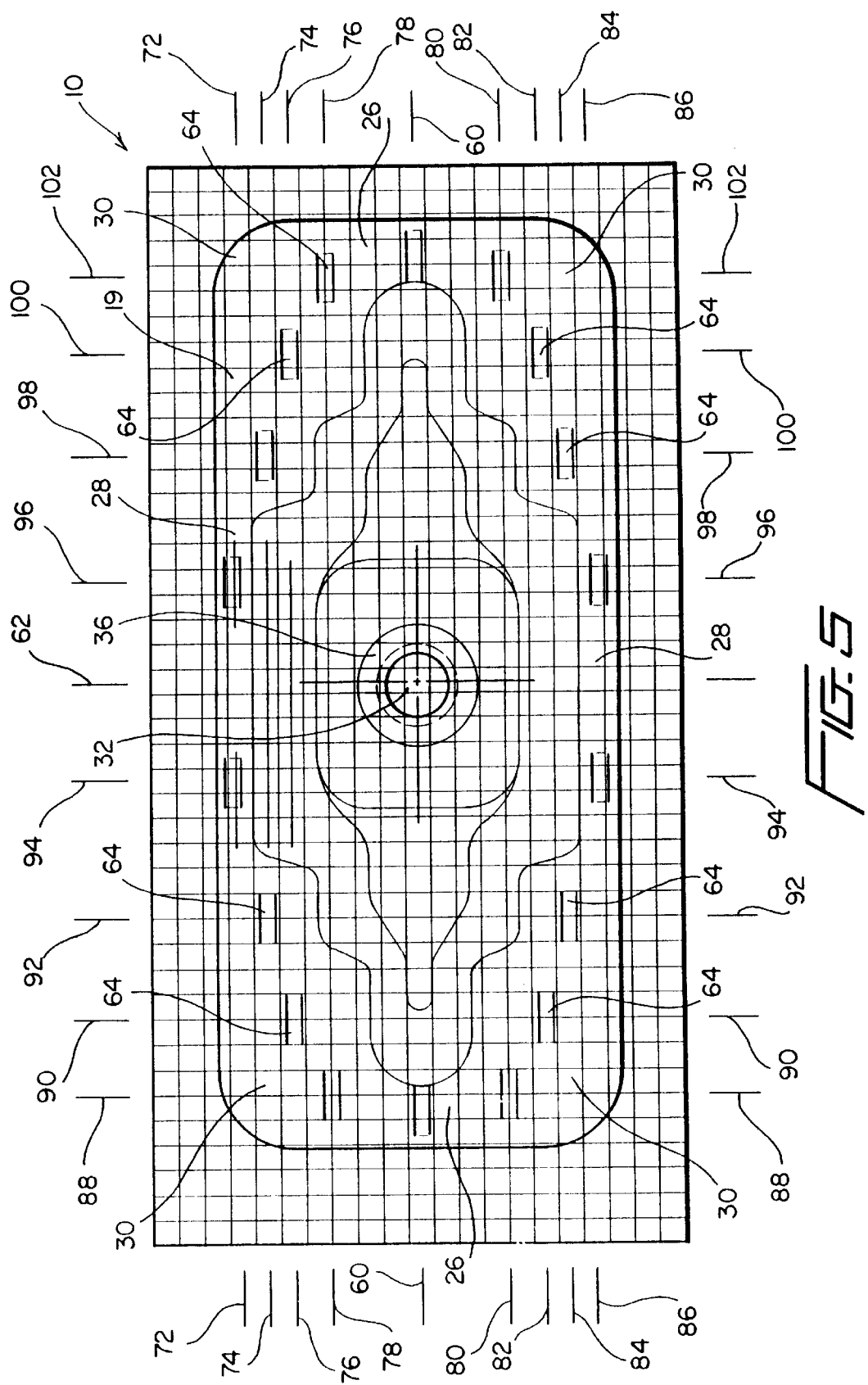
FIG. 5 is a top plan view similar to that of FIG. 2 showing, however, the first embodiment of the seam plate of the present invention effectively superimposed upon a grid which graphically represents the longitudinally and transversely oriented fiber composition of the membrane sheet and therefore clearly illustrates the longitudinal and transverse dispersement or distribution of the downwardly extending membrane sheet-engaging projections with respect to both the overall surface area of the seam plate and the aforenoted longitudinally and transversely oriented fiber composition of the membrane sheet.
Figure 7:
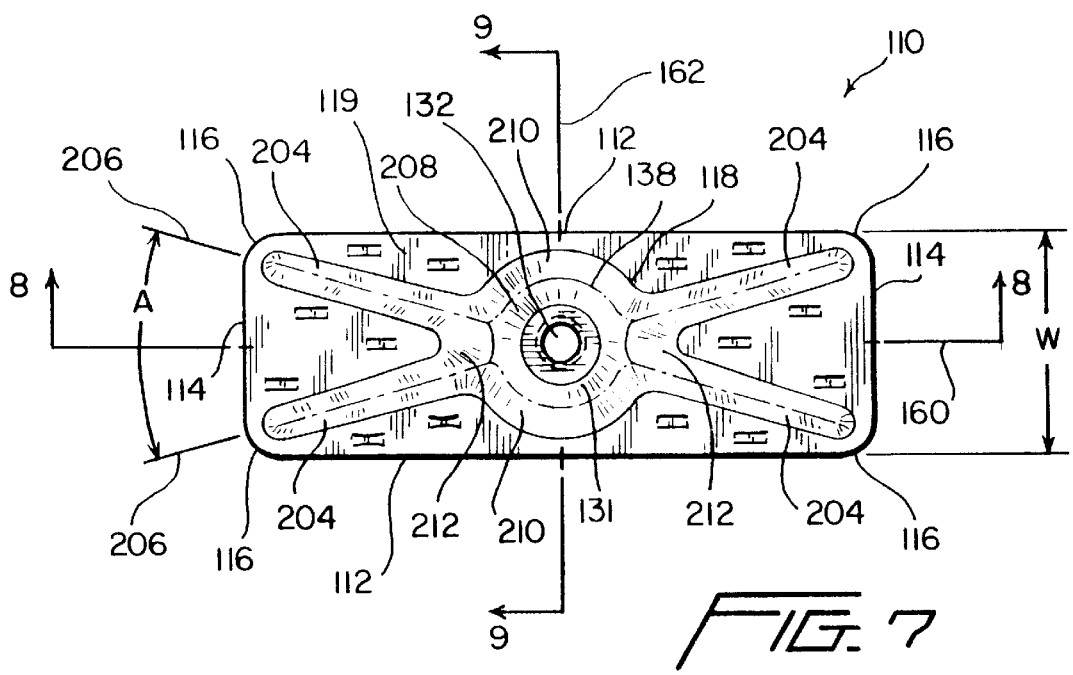
FIG. 7 is a top plan view similar to that of FIG. 2 showing, however, a second embodiment of a new and improved seam plate, for use in connection with the fixation of roof decking membrane sheets upon underlying insulation panels and roof decking, as constructed in accordance with the principles and teachings of the present invention and showing the significant structural components thereof.
Figure 8:
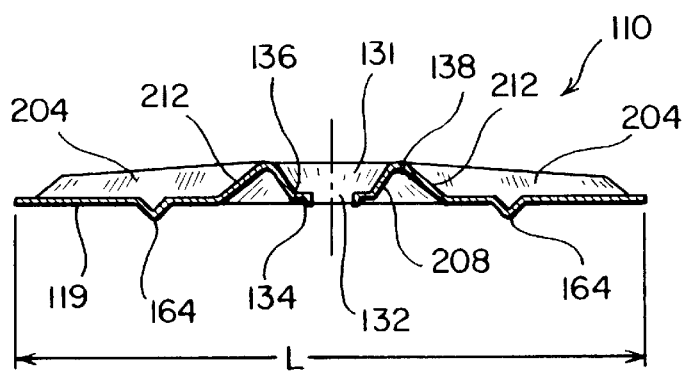
FIG. 8 is a longitudinal cross-sectional view of the seam plate as shown in FIG. 7 and as taken along the lines 8—8 of FIG. 7.
Figure 9:
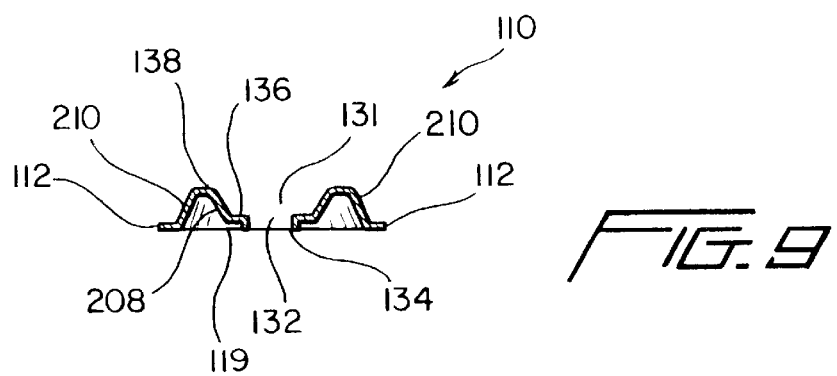
FIG. 9 is a lateral or transverse cross-sectional view of the seam plate as shown in FIG. 7 and as taken along the lines 9—9 of FIG. 7.

With reference still being made to FIG. 5, and with additional reference being made to FIG. 6, it is seen that the seam plate 10 further comprises a plurality of downwardly extending projections 64 for engaging the roof decking membranes 1 when the seam plate 10 is fixedly secured to the underlying roof decking 3 by means of, for example, the bolt fasteners 7. Each one of the downwardly extending projections 64 comprises structure which is particularly disclosed within FIG. 6, and which substantially corresponds to each one of the seam plate projections disclosed within the aforenoted U.S. patent application Ser. No. 09/933,230. More particularly, it is noted that the seam plate 10 may be fabricated, for example, from a suitable metal material, such as, for example, an aluminum-zinc alloy-coated steel sheet, and in fabricating or forming the downwardly extending projections 64, it is seen that each one of the projections 64 is effectively struck or punched out from the metal sheet material forming the seam plate 10 so as to be disposed beneath the undersurface of the seam plate 10. It is to be particularly noted that the projections 64 do not exhibit any sharp points as a result of the fact that each one of the projections 64 is severed along its opposite longitudinally extending sides from the metal sheet material forming the planar plate portion 19 of the seam plate 10, and is integrally connected at its oppositely disposed longitudinal ends to the metal sheet material forming the planar plate portion 19 of the seam plate 10.

Still further, it is also seen that each one of the downwardly extending projections 64 has a substantially V-shaped configuration as defined by means of a pair of leg or side portions 66, 68 which are preferably disposed with respect to each other at an included angle of 90°, while an apex portion 70 is defined at the intersection of the leg or side portions 66, 68. The opposite ends of the leg or side portions 66, 68 are integrally connected to the metal sheet material forming the planar plate portion 19 of the seam plate 10, and it is also seen that the apex portion 70 is rounded or radiused. In this manner, when the plurality of apex portions 70 of the plurality of projections 64 engage any one of the membrane sheets 1 covering the insulation panels 2 and the roof decking substructure 3, the rounded or radiused apex portions 70 will not readily tear or rupture the membrane sheets 1. Accordingly, the membrane sheets 1 will not readily suffer deterioration due to conventional tearing and rupture, and the structural integrity of the membrane sheets 1, as well as that of the roofing decking substructure assembly 2, 3, will be preserved. It is additionally noted that while the projections 64 have been noted as being substantially V-shaped in cross-sectional configuration, such cross-sectional structure is only exemplary. In lieu of the V-shaped configurations as defined by means of leg or side portions 66, 68 with the included angle of 90°, the projections 64 can have other configurations which nevertheless provide rounded or radiused portions similar to rounded or radiused apex portions 70. For example, the entire projection 64 could in effect have a semi-circular configuration. The critical feature of each projection 64 resides in the fact that the portion of each projection 64 which actually engages the membrane sheet 1 will be rounded or radiused so as not to tear, puncture, or otherwise rupture the underlying membrane sheet 1.

With reference again being made to FIG. 5, it is further seen that the seam plate 10 has been provided with a plurality, in particular, eighteen (18), of the downwardly extending projections 64, and that the projections 64 are geographically dispersed throughout the entire extent of the planar plate portion 19 of the seam plate 10 so as to be particularly located within both of the longitudinal border plate sections 26, 26, within both of the lateral border plate sections 28, 28, and within all four of the corner border plate sections 30, 30. It is noted still further that the projections 64 are also arranged within pairs along the longitudinal axis 60 of the seam plate 10 as well as along other longitudinally extending loci 72–86. Still further, the projections 64 are arranged within pairs along transversely extending loci 88–102, however, it is noted that none of the projections 64 are located along the transverse axis 62 of the seam plate 10. The reason for this is that should the seam plate 10 undergo or be exposed to severe bending forces under the influence of uplifting wind load forces acting upon the underlying membrane sheets 1, whereby the seam plate 10 might effectively be bent in half along its transverse axis 62, then since none of the projections 64 are located along what would under these circumstances be the bending axis 62 of the seam plate 10, none of the projection 64 will be subjected to fracture loads or forces whereby potentially sharp edge portions or points could otherwise be developed or generated so as to potentially tear or rupture the underlying membrane sheets 1 and thereby compromise the structural integrity of the underlying insulation panel 2 and roof decking 3 components.

It is also noted further that the projections 64, as located along their various longitudinal and transversely oriented axes 72–86 and 88–102, are also preferably located in a symmetrical manner with respect to the longitudinal and transverse axes 60, 62, although such is not absolutely necessary. For example, longitudinal loci 78 and 80 are located substantially equidistantly from longitudinal axis 60, as are longitudinal loci 76 and 82, 74 and 84, and 72 and 86. In a similar manner, transverse loci 94 and 96 are located substantially equidistantly from the transverse axis 62, as are transverse loci 92 and 98, 90 and 100, and 88 and 102, however, as noted, the projections 64 may be located in a substantially non-symmetrical, random manner with respect to longitudinal and transverse axes 60, 62. What is important, however, is the fact that the projections 64 are in fact located upon the different longitudinally and transversely dispersed axes 72–86 and 88–102.

The reason for this is that the membrane sheets 1 comprise a laminate structure comprising, for example, three layers, such as, for example, a first bottommost support layer for engaging the underlying insulation panel 2, an intermediate woven fabric layer, and an uppermost abrasion resistant and ultra-violet light resistant layer. Since each seam plate 10 will impress a predetermined amount of loading upon the underlying membrane sheet 1 as a result of the seam plate 10 being fixedly secured to the underlying roof decking 3 by means of its associated bolt fastener 7, then it is desirable that such loading not be concentrated upon, for example, a single fiber, or upon a limited number of fibers, of the laminated membrane sheet fabric, but more desirably, the loading should be dispersed throughout the entire portion of the membrane sheet 1 which is engaged by the seam plate 10 such that different fiber or fabric portions of the membrane sheet 1 can effectively share the loading. Sharing of the seam plate loading, or a deconcentration of the seam plate loading, effectively prevents a concentration of such loading upon a single or limited number of pressure points or membrane sheet fabric fibers which would otherwise lead to a tearing, rupture, or failure of the membrane sheet 1. Such tearing, rupture, or failure of the membrane sheet 1 would also rapidly propagate throughout the membrane sheet 1 thereby totally compromising the structural integrity of the membrane sheet 1, as well as that of the underlying insulation panel 2 and roof decking 3. The various longitudinal and transverse locations of the fibers of the membrane sheet 1 are graphically illustrated by means of the grid structure of FIG. 5 whereby it is clearly apparent how the various projections 64 are dispersed or distributed with respect to the longitudinally and transversely extending fibers of the membrane sheet 1 so as to in fact achieve the aforenoted deconcentration of the seam plate loading upon the membrane sheet 1.

Another important feature characteristic of the seam plate 10 of the present invention, and in particular, characteristic of the projections 64 of the seam plate 10, is that the longitudinal extent or axis of each individual projection 64 is disposed parallel to the longitudinal axis 60 of the seam plate 10. The reason for this is that the seam plate 10, as well as the projections 64, can handle or accommodate load forces most efficiently when the load forces are directed along axes or extents which are substantially perpendicular to the longitudinal axes of the seam plate 10 and each one of the projections 64. Consequently, as the substantially large uplifting wind load forces, acting upon each integral strip 8 of each membrane sheet 1 in directions which are parallel to the transverse axis 62 of the seam plate 10, as has been discussed hereinbefore, are impressed upon the seam plate 10 so as to tend to bend or flex the same, the longitudinally aligned projections 64 will tend to remain in a more securely engaged state with respect to the underlying membrane sheets 1 than if the projections 64 were aligned or oriented with their longitudinal extents or axes disposed at any angle other than parallel to the longitudinal axis 60.

It is noted still further that each projection 64 may have a width dimension which may be, for example, on the order of 0.065 inches, however, depending upon the particular structural composition of the particular membrane sheet 1 in connection with which the stress plate or seam plate 10 is being used, the actual width dimension of each projection 64 may vary. For example, if the particular membrane sheet 1 exhibits relatively low tear resistance or tensile strength values or properties, projections 64 may have relatively wider width dimensions so as to engage larger surface areas of the membrane sheet. Similarly, or conversely, if the membrane sheet 1 exhibits relatively high tear resistance or tensile strength values or properties, projections 64 may have relatively narrower width dimensions.

In a similar or related manner, the depth dimension of each projection 64 may also vary depending upon the gripping properties desired to be achieved with respect to the underlying membrane sheet 1. In view of the fact that, for example, as has been discussed hereinbefore, the rib structure 18 of the seam plate 10 imparts strengthening or rigidity characteristics to the seam plate 10 along the longitudinal and transverse axes 60, 62, thereby rendering the corner border plate sections 30 somewhat more flexible, the projections 64 which are located within the central portions or regions of the seam plate 10 have shorter depth dimensions than the other projections 64. For example, those projections 64 located at the intersections of transverse axes 94, 96 and longitudinal axes 72, 86 may have a depth dimension of, for example, 0.07 inches (0.07"), whereas the remaining projections 64 may have a depth dimension of, for example, 0.09 inches (0.09"). As the corner border plate sections 30 undergo some flexure due to the uplifting wind load forces, those projections 64 having the larger depth dimensions will still be able to remain engaged with the underlying membrane sheet 1. In an alternative mode, projections 64 which have larger depth dimensions may be utilized to achieve different gripping properties with respect to the underlying membrane sheets 1 regardless or independent of the uplifting wind load forces. For example, where or when it is desired that the projections actually penetrate, for example, the uppermost abrasion ultra-violet resistant layer, as well as the intermediate fabric layer, but not in fact penetrate the lowermost insulation panel-engaging layer, projections 64 having larger depth dimensions may be employed. Projections 64 having smaller depth dimensions may be utilized within other regions of the seam plate 10 so as to engage the underlying membrane sheet 1 without penetrating or piercing any layer components thereof.

With reference lastly being made to FIGS. 7–10, a second embodiment of a seam plate, constructed in accordance with the principles and teachings of the present invention, is disclosed and is generally indicated by the reference character 110. It is initially noted that the second embodiment seam plate 110 is conceptually similar to the first embodiment seam plate 10, that the second embodiment seam plate 110 comprises several structural features which are similar to those of the first embodiment seam plate 10, and therefore, an overall detailed description of the second embodiment seam plate 110 will be omitted primarily in favor of a detailed description of the differences between the first and second embodiment seam plates 10, 110. It is additionally noted that in view of the structural similarities between the first and second embodiment seam plates 10, 110, the various structural components or features of the second embodiment seam plate 110 which correspond to structural components or features of the first embodiment seam plate 10 will be designated by similar reference characters except that the reference characters for the second embodiment seam plate 110 will be within the 100 and 200 series. Accordingly, it is initially noted, for example, that in a manner similar to that of the first embodiment seam plate 10, the second embodiment seam plate 110 has a length dimension L of five inches (5.00") and a width dimension W of one and three-quarters inches (1.75"), and therefore, the length-to-width ratio of the seam plate 110 is well in excess of 2:1 or more particularly, 2.86:1.

With reference continuing to be made to FIGS. 7–10, it is readily apparent that the major difference between the second embodiment seam plate 110 and the first embodiment seam plate 10 resides in the fact that in lieu of the substantially diamond-shaped rib structure 18 characteristic of the first embodiment seam plate 10, the second embodiment seam plate 110 comprises a substantially X-shaped vertically upset or raised rib structure 118 comprising a plurality of ribbed leg members 204 which are arranged along the diagonals 206 of the substantially rectangular seam plate 110, and wherein the ribbed leg members 204 are disposed with respect to each other such that the included, divergent angle A defined therebetween is approximately thirty-one degrees (31°). The seam plate 110 further comprises a central downwardly recessed region 131 within which there is provided an aperture 132 through which a suitable bolt fastener 7, as disclosed within FIG. 1, may be inserted so as to fixedly secure the seam plate 110 to the underlying roof decking 3, 5 however, in lieu of the region 131 being circumscribed by means of a substantially rectangular upper peripheral ridge portion 38, the region 131 is circumscribed by means of a substantially circular upper peripheral ridge portion 138.

The upper peripheral ridge portion 138 is integrally connected to the annular shoulder portion 136 defining aperture 132 by means of a substantially circular downwardly inclined inner peripheral side wall 208, and is integrally connected to the primary planar plate section 119 of the seam plate 110 by means of a pair of diametrically opposed, substantially semi-circular downwardly inclined external side walls 210, 210.

In a similar manner, each pair of converging ribbed leg members 204, 204 is integrally connected to the upper peripheral ridge portion 138 by means of a pair of diametrically opposed, upwardly inclined external side walls 212, 212. In view of the aforenoted rib structure 118 characteristic of the second embodiment seam plate 110, it is readily apparent that the second embodiment seam plate 110 exhibits stiffness or rigidity characteristics or properties which 25 are significantly different than the stiffness or rigidity characteristics or properties of the seam plate 10. In particular, in view of the fact that the diagonally-arranged ribbed leg members 204, 204 extend substantially toward the corner regions 116 of the seam plate 110, the corner regions 116 of the seam plate 110 will effectively be reinforced and will thereby exhibit enhanced rigidity, with consequently less flexibility or bendability, properties as compared to the corresponding properties characteristic of the corner border plate sections 30 of the seam plate 10. Accordingly, the second embodiment seam plate 110 can be advantageously employed in connection with membrane sheets 1 which exhibit relatively high abrasion resistant properties.

Figure 10:
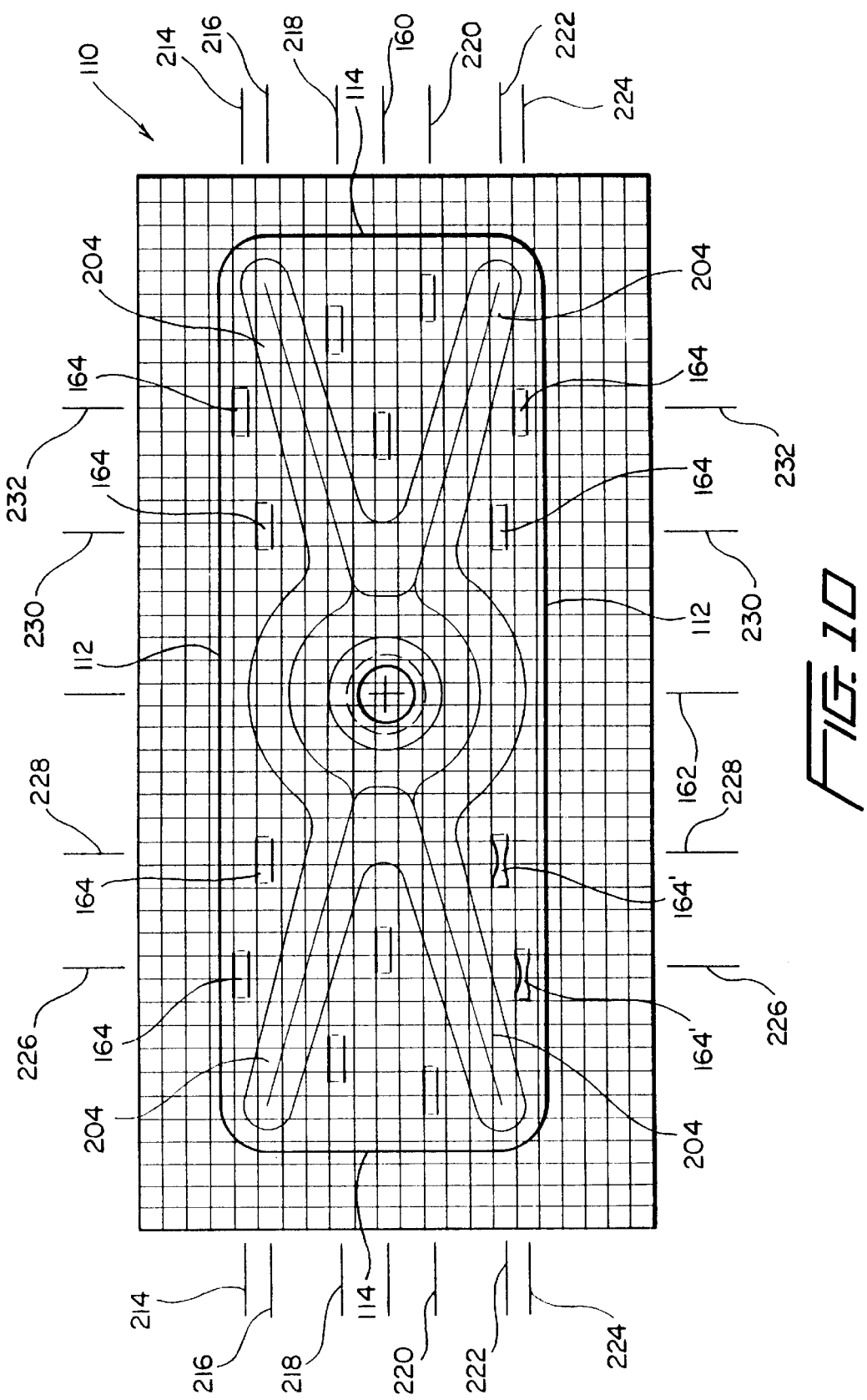
FIG. 10 is a top plan view similar to that of FIG. 7 showing, however, the second embodiment of the seam plate of the present invention effectively superimposed upon a grid, similar to that of FIG. 5, so as to again graphically represent the longitudinally and transversely oriented fiber composition of the membrane sheet and therefore clearly illustrate the longitudinal and transverse dispersement or distribution of the downwardly extending membrane sheet-engaging projections with respect to both the overall surface area of the seam plate and the aforenoted longitudinally and transversely oriented fiber composition of the membrane sheet

With particular reference lastly being made to FIG. 10, it is further appreciated that, as was the case with the first embodiment seam plate 10, the second embodiment seam plate 110 comprises a plurality of downwardly extending projections 164 for engaging the underlying membrane sheets 1 when the seam plate 110 is secured to the underlying roof decking 3 by means of a suitable bolt fastener 7. While the first embodiment seam plate 10 comprised, for example, eighteen (18) projections 64 dispersed throughout the primary planar plate section 19, the second embodiment seam plate 110 comprises, for example, fourteen (14) projections 164 dispersed throughout the primary planar plate section 119. More particularly, as was the case with the first embodiment seam plate 10, it is seen that the projections 164 are disposed within pairs aligned along the longitudinal axis 160 of the seam plate 110 as well as along linear loci 214–224 disposed parallel to the longitudinal axis 160, and it is seen that no projections 164 are disposed at the longitudinal mid-point of the seam plate 110 or, in other words, along the transverse axis 162. However, contrary to the arrangement or array of the projections 64 of the seam plate 10, not all of the projections 164 of the seam plate 110 are arranged within pairs along additional loci transverse to the longitudinal axis 160. In particular, it is seen that only eight (8) of the projections 164 are arranged within transversely aligned pairs and that they are disposed along transversely arranged loci 226–232. As was the case with the first embodiment seam plate 10, it is seen however that when the projections 164 are disposed along their longitudinal and transverse loci 214–224 and 226–232, respectively, the loci are symmetrically arranged with respect to the longitudinal and transverse seam plates axes 160, 162. For example, longitudinal loci 214 and 224 are equidistant from longitudinal axis 160, as are longitudinal loci 216 and 222, as well as longitudinal loci 218 and 220. In a similar manner, transverse loci 226 and 232 are equidistant from transverse axis 162 as are transverse loci 228 and 230.

As a last feature characteristic of the seam plate 110, developed and constructed in accordance with the teachings and principles of the present invention, and equally applicable to seam plate 10, it has been previously noted that the projections 64 could be varied in connection with, for example, their depth and width dimensions depending upon the particular gripping characteristics that are desired to be achieved with respect to usage in conjunction with different membrane sheets 1. Accordingly, it can be further appreciated from FIG. 10 that a variation in the structure of the projections 164 is disclosed in connection with the projections 164' disposed upon the seam plate 110 at the intersection of the longitudinal and transverse loci 224, 226 and 222, 228. In particular, it is seen that each one of the projections 164' has a substantially hourglass configuration. By means of such structure, the projections 164' are able to, for example, pierce or penetrate the upper and intermediate layers of the membrane sheet 1, or alternatively, if, in accordance with a technique for securing the membrane sheet 1, the edge or seamed portion of the membrane sheet 1 is folded over upon itself, the projections 164' could penetrate or pierce the upper folded ply portion of the membrane sheet 1 but simply grippingly engage the lower ply portion of the membrane sheet 1 without piercing or penetrating the same, all as desired in order to achieve securement or fixation of partiuclar membrane sheets 1 to the underlying roof decking 3. It is of course to be readily appreciated still further that various edge shapes, other than, for example, an hourglass configuration, may be integrally incorporated into the different projections so as to further match the gripping power of the projections to the rigidity of a particular section of the seam plate and with respect to the directions of the load forces within the membrane.

Thus, it may be seen that in accordance with the principles and teachings of the present invention, a new and improved seam plate has been developed wherein the same has a substantially rectangular configuration for more efficiently accommodating the directional characteristics of the uplifting wind load forces, and in addition, the seam plate is provided with rib structure for advantageously reinforcing different regions of the seam plate depending upon, for example, the abrasion resistant characteristics of the membrane sheet to be secured to the underlying roof decking. Rounded or radiused projections are also provided upon the undersurface of the seam plate and are dispersed through the planar portion of the seam plate so as to optimally distribute the pressure points or load locations throughout different portions of the membrane sheet. In this manner, the load or pressure is not concentrated at any one or limited number of locations upon the membrane sheet so as to effectively prevent the occurrence of tearing or rupture of the same and the consequent propagation of such tearing or rupture throughout the membrane sheet. Accordingly, the structural integrity of the membrane sheets, as well as that of the overall underlying roofing decking substructure assembly, is preserved.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A seam plate for securing a membrane sheet to an underlying roof decking substructure assembly, comprising:

a plate having a substantially rectangular configuration comprising a longitudinal axis, a transverse axis, a pair of oppositely disposed longitudinally extending sides, a pair of oppositely disposed transversely extending ends, and substantially rounded corners interconnecting each one of said oppositely disposed longitudinally extending sides to one of said oppositely disposed transversely extending ends such that substantially sharp locations are absent from edge portions of said plate so as not to present potential sites at which tearing and rupture of the membrane sheet can occur;

an aperture defined within a central portion of said plate for receiving a fastener for securing said plate to an underlying roof decking substructure assembly;

a plurality of projections, respectively severed from said plate along first opposite regions, integrally connected to said plate along second opposite regions, and having rounded engagement portions extending downwardly from said plate, and continuously between said second oppositely disposed integrally connected regions, for engaging a membrane sheet so as to effectively secure the membrane sheet to the underlying substructure without piercing the membrane sheet so as not to cause tearing and rupture of the membrane sheet when said plate is fixedly secured to the underlying substructure by the fastener; and rib structure projecting upwardly from predetermined portions of said plate so as to provide different regions of said plate with different rigidity and flexibility characteristics whereby said plate can be used with predetermined membrane sheets having predetermined properties so as to predeterminedly accommodate uplifting wind load forces acting upon a predetermined one of the membrane sheets.

2. The seam plate as set forth in claim 1, wherein:

said rib structure has a substantially diamond-shaped configuration, wherein longitudinal ends of said substantially diamond-shaped rib structure are disposed upon opposite sides of said longitudinal axis of said plate, and lateral sides of said substantially diamond-shaped rib structure are disposed upon opposite sides of said transverse axis of said plate, such that corner regions of said plate exhibit a relatively low degree of rigidity and a relatively high degree of flexibility and bendability.

3. The seam plate as set forth in claim 2, wherein:

said plurality of downwardly extending projections are arranged within a plurality of longitudinally separated pairs wherein each longitudinally separated pair of downwardly extending projections is disposed upon a separate longitudinally extending locus disposed parallel to said longitudinal axis of said plate so as to distribute pressure loads throughout the membrane sheet.

4. The seam plate as set forth in claim 2, wherein:

said plurality of downwardly extending projections are arranged within a plurality of transversely separated pairs wherein each transversely separated pair of downwardly extending projections is disposed upon a separate transversely extending locus disposed parallel to said transverse axis of said plate so as to distribute pressure loads throughout the membrane sheet.

5. The seam plate as set forth in claim 1, wherein:

said rib structure has a substantially X-shaped configuration wherein said rib structure extends from a central region of said plate to corner regions of said plate such that said corner regions of said plate exhibit a relatively high degree of rigidity and a relatively low degree of flexibility and bendability.

6. The seam plate as set forth in claim 5, wherein:

said plurality of downwardly extending projections are arranged within a plurality of longitudinally separated pairs wherein each longitudinally separated pair of downwardly extending projections is disposed upon a separate longitudinally extending locus disposed parallel to said longitudinal axis of said plate so as to distribute pressure loads throughout the membrane sheet.

7. The seam plate as set forth in claim 5, wherein:

said plurality of downwardly extending projections are arranged within a plurality of transversely separated pairs wherein each transversely separated pair of downwardly extending projections is disposed upon a separate transversely extending locus disposed parallel to said transverse axis of said plate so as to distribute pressure loads throughout the membrane sheet.

8. The seam plate as set forth in claim 1, wherein:

said substantially rectangular seam plate has a length-to-width ratio of at least 2:1 so as to efficiently accommodate and withstand the uplifting wind load forces acting upon the membrane sheet when the membrane sheet is secured to the underlying roof decking substructure assembly by said seam plate.

9. The seam plate as set forth in claim 1, wherein:

each one of said plurality of downwardly extending projections has a substantially V-shaped cross-sectional configuration, and said rounded engagement portion of said downwardly extending projection comprises a radiused apex portion of said substantially V-shaped projection.

10. The seam plate as set forth in claim 9, wherein:

each one of said substantially V-shaped projections comprises a pair of sides with an included angle defined at said apex portion of 90°.

11. The seam plate as set forth in claim 1, wherein:

predetermined ones of said plurality of downwardly extending projections have hourglass configurations for enhancing the gripping engagement properties characteristic of said downwardly extending projections.

12. The seam plate as set forth in claim 1, wherein:

each one of said downwardly extending projections has a longitudinal extent which is disposed parallel to said longitudinal axis of said seam plate so as to efficiently accommodate uplifting wind load forces.

13. The seam plate as set forth in claim 12, wherein:

each one of said projections is severed from said plate along longitudinally extending sides thereof and are integrally connected to said plate along longitudinally separated ends thereof.

14. The seam plate as set forth in claim 1, wherein:

said plate comprises a substantially planar plate having a substantially planar base surface which is adapted to be seated atop the underlying roof decking substructure assembly;

said aperture is defined within a central portion of said substantially planar base surface of said substantially planar plate for receiving the fastener for securing said plate to the underlying roof decking substructure assembly; and said rib structure projects upwardly from predetermined upper surface portions of said substantially planar plate so as to provide said different regions of said substantially planar plate with different rigidity and flexibility characteristics.

15. In combination, a roof decking assembly, comprising:

a roof decking substructure;

an insulation panel disposed upon said roof decking substructure;

a membrane sheet which is adapted to be disposed atop said insulation panel and secured to said roof decking substructure;

a seam plate for securing said membrane sheet to said roof decking substructure; and a fastener for securing said seam plate to said roof decking substructure;

said seam plate comprising a plate having a substantially rectangular configuration comprising a longitudinal axis, a transverse axis, a pair of oppositely disposed longitudinally extending sides, a pair of oppositely disposed transversely extending ends, and substantially rounded corners interconnecting each one of said oppositely disposed longitudinally extending sides to one of said oppositely disposed transversely extending ends such that substantially sharp locations are absent from edge portions of said plate so as not to present potential sites at which tearing and rupture of said membrane sheet can occur; an aperture defined within a central portion of said plate for receiving said fastener for securing said plate to said roof decking substructure;

a plurality of projections, respectively severed from said plate along first opposite regions, integrally connected to said plate along second opposite regions, and having rounded engagement portions extending downwardly from said plate, and continuously between said second oppositely disposed integrally connected regions, for engaging said membrane sheet so as to effectively secure said membrane sheet to said roof decking substructure without piercing the membrane sheet so as not to cause tearing and rupture of the membrane sheet when said plate is fixedly secured to said roof decking substructure by said fastener; and rib structure projecting upwardly from predetermined portions of said plate so as to provide different regions of said plate with different rigidity and flexibility characteristics whereby said plate can be used with predetermined membrane sheets having predetermined properties so as to predeterminedly accommodate uplifting wind load forces acting upon predetermined membrane sheets.

16. The combination as set forth in claim 15, wherein:

said rib structure has a substantially diamond-shaped configuration, wherein longitudinal ends of said substantially diamond-shaped rib structure are disposed upon opposite sides of said longitudinal axis of said plate, and lateral sides of said substantially diamond-shaped rib structure are disposed upon opposite sides of said transverse axis of said plate, such that corner regions of said plate exhibit a relatively low degree of rigidity and a relatively high degree of flexibility and bendability.

17. The combination as set forth in claim 16, wherein:

said plurality of downwardly extending projections are arranged within a plurality of longitudinally separated pairs wherein each longitudinally separated pair of downwardly extending projections is disposed upon a separate longitudinally extending locus disposed parallel to said longitudinal axis of said plate so as to distribute pressure loads throughout said membrane sheet.

18. The combination as set forth in claim 16, wherein:

said plurality of downwardly extending projections are arranged within a plurality of transversely separated pairs wherein each transversely separated pair of downwardly extending projections is disposed upon a separate transversely extending locus disposed parallel to said transverse axis of said plate so as to distribute pressure loads throughout said membrane sheet.

19. The combination as set forth in claim 15, wherein:

said rib structure has a substantially X-shaped configuration wherein said rib structure extends from a central region of said plate to corner regions of said plate such that said corner regions of said plate exhibit a relatively high degree of rigidity and a relatively low degree of flexibility and bendability.

20. The combination as set forth in claim 16, wherein:

said plurality of downwardly extending projections are arranged within a plurality of longitudinally separated pairs wherein each longitudinally separated pair of downwardly extending projections is disposed upon a separate longitudinally extending locus disposed parallel to said longitudinal axis of said plate so as to distribute pressure loads throughout said membrane sheet.

21. The combination as set forth in claim 19, wherein:

said plurality of downwardly extending projections are arranged within a plurality of transversely separated pairs wherein each transversely separated pair of downwardly extending projections is disposed upon a separate transversely extending locus disposed parallel to said transverse axis of said plate so as to distribute pressure loads throughout said membrane sheet.

22. The combination as set forth in claim 15, wherein:

said substantially rectangular seam plate has a length-to-width ratio of at least 2:1 so as to efficiently accommodate and withstand the uplifting wind load forces acting upon said membrane sheet when said membrane sheet is secured to said roof decking substructure by said seam plate.

23. The combination as set forth in claim 15, wherein:

each one of said plurality of downwardly extending projections has a substantially V-shaped cross-sectional configuration, and said rounded engagement portion of said downwardly extending projection comprises a radiused apex portion of said substantially V-shaped projection.

24. The combination as set forth in claim 23, wherein:

each one of said substantially V-shaped projections comprises a pair of sides with an included angle defined at said apex portion of 90°.

25. The combination as set forth in claim 15, wherein:

predetermined ones of said plurality of downwardly extending projections have hourglass configurations for enhancing the gripping engagement properties characteristic of said downwardly extending projections.

26. The combination as set forth in claim 15, wherein:

each one of said downwardly extending projections has a longitudinal extent which is disposed parallel to said longitudinal axis of said seam plate so as to efficiently accommodate uplifting wind load forces.

27. The seam plate as set forth in claim 26, wherein:

each one of said projections is severed from said plate along longitudinally extending sides thereof and are integrally connected to said plate along longitudinally separated ends thereof.

28. The seam plate as set forth in claim 15, wherein:

said plate comprises a substantially planar plate having a substantially planar base surface which is adapted to be seated atop said roof decking substructure;

said aperture is defined within a central portion of said substantially planar base surface of said substantially planar plate for receiving said fastener for securing said plate to said roof decking substructure; and said rib structure projects upwardly from predetermined upper surface portions of said substantially planar plate so as to provide said different regions of said substantially planar plate with different rigidity and flexibility characteristics.

* * * * *